US012046775B2

(12) United States Patent
Collins

(10) Patent No.: US 12,046,775 B2
(45) Date of Patent: Jul. 23, 2024

(54) BATTERY MODULE FLEX CIRCUIT

(71) Applicant: Rivian IP Holdings, LLC, Plymouth, MI (US)

(72) Inventor: Tyler Collins, Irvine, CA (US)

(73) Assignee: Rivian IP Holdings, LLC, Plymouth, MI (US)

( * ) Notice: Subject to any disclaimer, the term of this patent is extended or adjusted under 35 U.S.C. 154(b) by 324 days.

(21) Appl. No.: 17/356,768

(22) Filed: Jun. 24, 2021

(65) Prior Publication Data

US 2022/0416364 A1 Dec. 29, 2022

(51) Int. Cl.
*H01M 50/507* (2021.01)
*H01M 10/42* (2006.01)
*H01M 50/213* (2021.01)
*H01M 50/519* (2021.01)
*H01M 50/543* (2021.01)

(52) U.S. Cl.
CPC ....... *H01M 50/507* (2021.01); *H01M 10/425* (2013.01); *H01M 50/213* (2021.01); *H01M 50/519* (2021.01); *H01M 50/543* (2021.01)

(58) Field of Classification Search
None
See application file for complete search history.

(56) References Cited

U.S. PATENT DOCUMENTS

| 10,720,626 | B2 * | 7/2020 | Harris | H01M 50/516 |
| 2002/0180301 | A1 * | 12/2002 | Ebihara | H02K 13/006 |
| | | | | 310/239 |
| 2004/0009334 | A1 * | 1/2004 | Miyamoto | H01M 50/569 |
| | | | | 428/209 |
| 2006/0040173 | A1 * | 2/2006 | Shimamura | H01M 10/486 |
| | | | | 180/68.5 |
| 2015/0064516 | A1 * | 3/2015 | Swoish | H02G 5/025 |
| | | | | 429/61 |
| 2017/0003349 | A1 * | 1/2017 | Dawley | H01M 50/507 |

(Continued)

FOREIGN PATENT DOCUMENTS

CN 207719360 U * 8/2018
JP 2017147029 A * 8/2017

OTHER PUBLICATIONS

English translation CN207719360U as taught by Chen (Year: 2018).*

(Continued)

*Primary Examiner* — Anca Eoff
(74) *Attorney, Agent, or Firm* — Haley Guiliano LLP

(57) ABSTRACT

A flex circuit and a battery module including the flex circuit are provided. The flex circuit includes a first plurality of conductive traces and a second plurality of conductive traces. Each of the first plurality of conductive traces includes a first terminal configured to be electrically coupled to a first location of a respective one of a plurality of busbars that electrically connect battery cells of the battery module, and a second terminal configured to be electrically coupled to processing circuitry. Each of the second plurality of conductive traces includes a first terminal configured to be electrically coupled to a second location of a respective one of the plurality of busbars, and a second terminal configured to be electrically coupled to the processing circuitry. The processing circuitry is configured to measure a voltage level of each of the plurality of busbars using the first and second plurality of conductive traces.

20 Claims, 9 Drawing Sheets

(56) References Cited

U.S. PATENT DOCUMENTS

2019/0305265 A1* 10/2019 Wynn ................. H01M 50/209
2020/0152948 A1* 5/2020 Butterfield et al. .........................
                                                        H01M 10/6553
2020/0203779 A1* 6/2020 Wang ................. H01M 50/271

OTHER PUBLICATIONS

Wikipedia [Circuit Breaker] (Year: 2023).*
English translation JP-2017147029-A as taught by Kida (Year: 2017).*
PC magazine [wire trace] (Year: 2023).*

* cited by examiner

BATTERY MODULE FLEX CIRCUIT

SUMMARY

It is advantageous to provide battery module monitoring circuitry to monitor the voltage and temperature of battery cells, or groups thereof, within a battery module. Connecting the battery module monitoring circuitry to the battery cells, however, requires a wiring harness including a large number of wires that must be routed through the battery module and electrically connected to the battery cells (e.g., through busbars connecting the battery cells) in a time-consuming process. Additionally, because the wires are routed through the battery module, it is possible that at least one of the wires may be damaged in the case of a thermal runaway event (e.g., due to internal battery cell defects). Accordingly, in some embodiments, it would be advantageous to connect the battery module monitoring circuitry to the battery cells without requiring a wiring harness including a large number of wires or a time-consuming process of routing the wires through the battery module. Additionally, in some embodiments, it would be advantageous to be able to continue to monitor the battery cells in the case of a thermal runaway event or a wire failure.

To solve one or more of these problems, a battery module and a flex circuit (e.g., a flexible printed circuit board) for connecting battery module monitoring circuitry to battery cells, or groups thereof, within a battery module, are provided. The flex circuit includes a plurality of conductive traces that are connected to a battery current collector and that provide redundant paths to the battery current collector. For example, terminals of two conductive traces may be connected to two different locations on the battery current collector (e.g., to different locations on a busbar of the battery current collector). In some embodiments, the conductive traces may substantially mirror the shape of the current collector. Thus, the battery current collector may support the flex circuit while providing connection points between the conductive traces and the battery current collector. Additionally, because conductive traces may not directly pass over battery cells (e.g., the battery current collector may shield the conductive traces from exposure to individual battery cells), the conductive traces may be protected in the case of a thermal runaway event. If, however, one of the conductive traces is damaged (e.g., in the case of a thermal runaway event), the battery module monitoring circuitry may continue to monitor the battery cells (or group thereof) by the redundant conductive trace.

In some embodiments, the flex circuit includes a first plurality of conductive traces and a second plurality of conductive traces. Each of the first plurality of conductive traces includes a first terminal configured to be electrically coupled to a first location of a respective one of a plurality of busbars that electrically connect a plurality of battery cells of the battery module, and a second terminal configured to be electrically coupled to processing circuitry (e.g., battery module monitoring circuitry). Each of the second plurality of conductive traces includes a first terminal configured to be electrically coupled to a second location of a respective one of the plurality of busbars, and a second terminal configured to be electrically coupled to the processing circuitry.

In some embodiments, the battery module includes a current collector assembly that includes the plurality of busbars configured to electrically connect the plurality of battery cells of the battery module and the flex circuit. Each of the plurality of busbars includes respective first and second locations to which corresponding ones of the first plurality of conductive traces and the second plurality of conductive traces are configured to be electrically coupled.

In some embodiments, the battery module may further include a current collector frame disposed between the current collector assembly and the flex circuit. The current collector frame may be a plastic, and the flex circuit may be attached to the current collector frame by an adhesive.

In some embodiments, the battery module may further include the processing circuitry. The flex circuit may include a first electrical connector coupled to the first plurality of conductive traces and the second plurality of conductive traces. The processing circuitry may include a second electrical connector. The second terminals of the first plurality of conductive traces and the second plurality of conductive traces may be electrically coupled to the processing circuitry when the first electrical connector and the second electrical connector are connected.

In some embodiments, the processing circuitry may be mounted on a side of the battery module, and the flex circuit may extend from the side of the battery module across a middle portion of the top or bottom of the battery module. A first end of the flex circuit proximate to the side of the battery module may be oriented substantially parallel to the side of the battery module, and a second opposite end of the flex circuit may be oriented substantially parallel to the top or bottom of the battery module. The first electrical connector may be located at the first end of the flex circuit, and the flex circuit may be secured to the battery module by the first electrical connector being connected to the second electrical connector and adhesive applied to a portion of the flex circuit that extends across the middle portion of the top or bottom of the battery module.

In some embodiments, the flex circuit may extend from one side of the battery module across the battery module, the first plurality of conductive traces may be routed along the left side of the flex circuit, and the second plurality of conductive traces may be routed along the right side of the flex circuit.

In some embodiments, the flex circuit may extend from one side of the battery module across the battery module, and each of the plurality of busbars may include a spine that traverses the battery module perpendicular to the flex circuit, and a plurality of projections that extend perpendicular to the spine. The flex circuit may include at least two parallel segments that are positioned above respective projections of the busbars.

In some embodiments, the battery module may further include the plurality of battery cells. The plurality of battery cells may be arranged in a plurality of groups. The plurality of busbars may be configured to electrically connect battery cells in each of the plurality of groups in parallel with each other and electrically connect each of the plurality of groups in series with each other.

In some embodiments, the processing circuitry may be configured to measure a voltage level of each of the plurality of busbars using the first plurality of conductive traces and the second plurality of conductive traces.

In some embodiments, the processing circuitry may combine analog signal paths corresponding to each pair of conductive traces configured to be electrically coupled to the first and second locations of each respective busbar.

In some embodiments, the battery module may further include a plurality of ribbons. Each of the first terminals may be electrically connected to a respective location of a respective busbar with a respective ribbon. For each of the respective ribbons, a respective first end may be connected to a respective first terminal by laser or ultrasonic welding, and a respective second end may be connected to a respective location of a respective busbar by laser or ultrasonic welding.

In some embodiments, each of the respective ribbons is nickel, aluminum, or copper and each of the plurality of busbars is aluminum. An adhesive may be applied above a portion of each of the respective ribbons in contact with a respective busbar, and the adhesive, when cured, may isolate each portion of each respective ribbon from air.

In some embodiments, the flex circuit may further include a first power conductive trace coupled to one of the first terminals configured to be electrically coupled to a first one of the plurality of busbars, and a second power conductive trace coupled to one of the first terminals configured to be electrically coupled to a second one of the plurality of busbars. The first and second power conductive traces may be configured to provide power to the processing circuitry.

In some embodiments, the battery module may further include a cover connected to the current collector frame. The flex circuit may be disposed between the cover and the current collector frame.

In some embodiments, each of the first plurality of conductive traces and the second plurality of conductive traces may be balanced to each have substantially the same resistance.

In some embodiments, the current collector may be a first current collector assembly, the plurality of busbars may be a first plurality of busbars, the plurality of battery cells may be a first plurality of battery cells, and the flex circuit may be a first flex circuit. The battery module may further include a second current collector assembly including a second plurality of busbars configured to electrically connect a second plurality of battery cells, and a second flex circuit. The second flex circuit may include a third plurality of conductive traces and a fourth plurality of conductive traces. Each of the third plurality of conductive traces may include a first terminal configured to be electrically coupled to a first location of a respective one of the second plurality of busbars, and a second terminal configured to be electrically coupled to the processing circuitry. Each of the fourth plurality of conductive traces may include a first terminal configured to be electrically coupled to a second location of a respective one of the second plurality of busbars, and a second terminal configured to be electrically coupled to the processing circuitry. Each of the second plurality of busbars may include respective first and second locations to which corresponding ones of the third plurality of conductive traces and the fourth plurality of conductive traces are configured to be electrically coupled.

In some embodiments, the first plurality of battery cells may be mounted on a first side of a cooling plate, and the second plurality of battery cells may be mounted on a second side of the cooling plate, opposite to the first side.

BRIEF DESCRIPTION OF THE DRAWINGS

The above and other objects and advantages of the present disclosure will be apparent upon consideration of the following detailed description, taken in conjunction with the accompanying drawings, in which like reference characters refer to like parts throughout, and in which.

DESCRIPTION

FIGS. 1-7 show a battery module and flex circuit, and components of the battery module and flex circuit, in accordance with some embodiments of the present disclosure.

Figure 1:
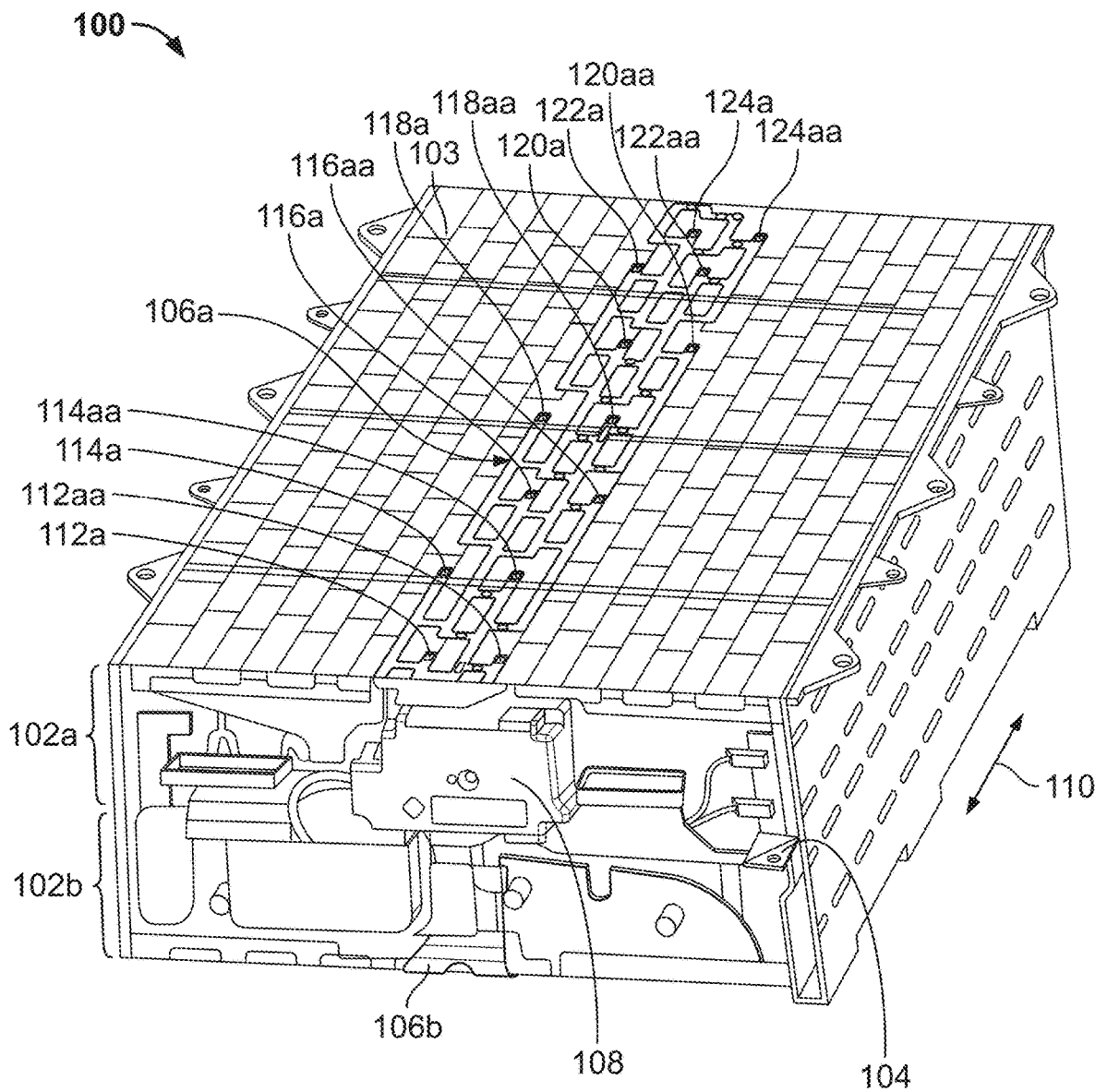
FIG. 1 shows a perspective view of a battery module, in accordance with some embodiments of the present disclosure.

FIG. 1 shows a perspective view of a battery module 100, in accordance with some embodiments of the present disclosure. As shown, the battery module 100 may include a first submodule 102a and a second submodule 102b coupled to opposite sides of a cooling plate 104. However, this is only an example, and the battery module 100 may include a single submodule. As described in greater detail below, each of the first and second submodules 102a, 102b may include a plurality of battery cells arranged in a plurality of groups, and a current collector assembly including a plurality of busbars electrically connecting the battery cells in each of the plurality of groups in parallel with each other and electrically connecting each of the plurality of groups in series with each other. For example, pattern 103 shown on the top surface of the battery module 100 may correspond to an arrangement of the plurality of busbars of the first submodule 102a, as shown in greater detail in FIGS. 4 and 7. Each of the plurality of groups of the battery cells in the first submodule 102a may be arranged sequentially along a direction 110 (e.g., connected in series along the direction 110). The second submodule 102b may be substantially similar to the first submodule 102a and therefore is not described here in detail. Although the battery module 100 is described as including a plurality of busbars, the battery module 100 may include a single busbar (or pair of busbars) electrically connecting the battery cells (e.g., in parallel).

As shown, the battery module 100 may include a first flex circuit 106a and a second flex circuit 106b. As shown, the first flex circuit 106a may be disposed on a top surface of the first submodule 102a (e.g., a top surface of the battery module 100), and the second flex circuit 106b may be disposed on a top surface of the second submodule 102b (e.g., a bottom surface of the battery module 100), as shown in greater detail in FIG. 2. As shown, the first flex circuit 106a may have a first end connected to processing circuitry 108 (e.g., a battery voltage and temperature (BVT) acquisition unit) mounted on a side of the battery module 100, and may extend from the first end across a middle portion of the top surface of the first submodule 102a to a second end opposite the first end. In some embodiments, the middle portion corresponds to the midline plus and minus 10%, 15%, 20%, or 25% of the width. In some embodiments, the first flex circuit 106a comprises at least two parallel segments that are positioned above respective projections of the plurality of busbars (i.e., the first flex circuit 106a corresponds to a portion of the pattern 103), such that the at least two parallel segments may be shielded from a battery experiencing a thermal runaway event. As described in greater detail below, a first one of the at least two parallel segments may include a first plurality of conductive traces and a second one of the at least two parallel segments may include a second plurality of conductive traces. Each of the first plurality of conductive traces may include a first terminal (112a, 114a, 116a, 118a, 120a, 122a, 124a) configured to be electrically coupled to a first location of a respective one of the plurality of busbars, and a second terminal configured to be electrically coupled to the processing circuitry 108. Each of the second plurality of conductive traces may include a first terminal (112aa, 114aa, 116aa, 118aa, 120aa, 122aa, 124aa) configured to be electrically coupled to a second location of a respective one of the plurality of busbars, and a second terminal configured to be electrically coupled to the processing circuitry 108. That is, as shown, each of the plurality of busbars may be connected to the processing circuitry 108 by at least two separate conductive traces (e.g., a pair of conductive traces). The processing circuitry 108 may be configured to measure a voltage level of each of the plurality of busbars using the first plurality of conductive traces and the second plurality of conductive traces. In some embodiments, the first flex circuit 106a may include additional conductive traces for monitoring other parameters of the battery module 100 (e.g., temperature, current, etc.) The second flex circuit 106b is substantially similar to the first flex circuit 106a and may be connected to the second submodule 102b in a similar manner as described above and therefore is not described here in detail.

The processing circuitry 108 may include any suitable circuitry for processing signals received from the conductive traces of the first and second flex circuits 106a, 106b. For example, the processing circuitry 108 may include signal conditioning circuitry (e.g., filters, amplifiers, voltage dividers), an analog-to-digital converter, any other suitable circuitry, or any combination thereof. In some embodiments, the processing circuitry may include a processor, a power supply, power management components (e.g., relays, filters, voltage regulators), input/output (I/O) (e.g., GPIO, analog, digital), memory, communications equipment (e.g., CAN-bus hardware, Modbus hardware, or a WiFi module), any other suitable components, or any combination thereof. In some embodiments, the processing circuitry 108 may include one or more microprocessors, microcontrollers, digital signal processors, programmable logic devices, field-programmable gate arrays (FPGAs), application-specific integrated circuits (ASICs), etc., and may include a multi-core processor. In some embodiments, the processing circuitry 108 may be distributed across multiple separate processors or processing units, for example, multiple of the same type of processing units or multiple different processors.

In some embodiments, the processing circuitry 108 executes instructions stored in memory for monitoring a battery system (e.g., including the battery module 100), managing a battery system, or both. In some embodiments, memory may be an electronic storage device that is part of the processing circuitry 108. For example, memory may be configured to store electronic data, computer software, or firmware, and may include random-access memory, read-only memory, hard drives, optical drives, solid state devices, or any other suitable fixed or removable storage devices, and/or any combination of the same. Nonvolatile memory may also be used (e.g., to launch a boot-up routine and other instructions). In some embodiments, the processing circuitry 108 may be coupled to more than one battery module (e.g., via any suitable number of cables and connectors), corresponding to more than one battery module.

Figure 2:
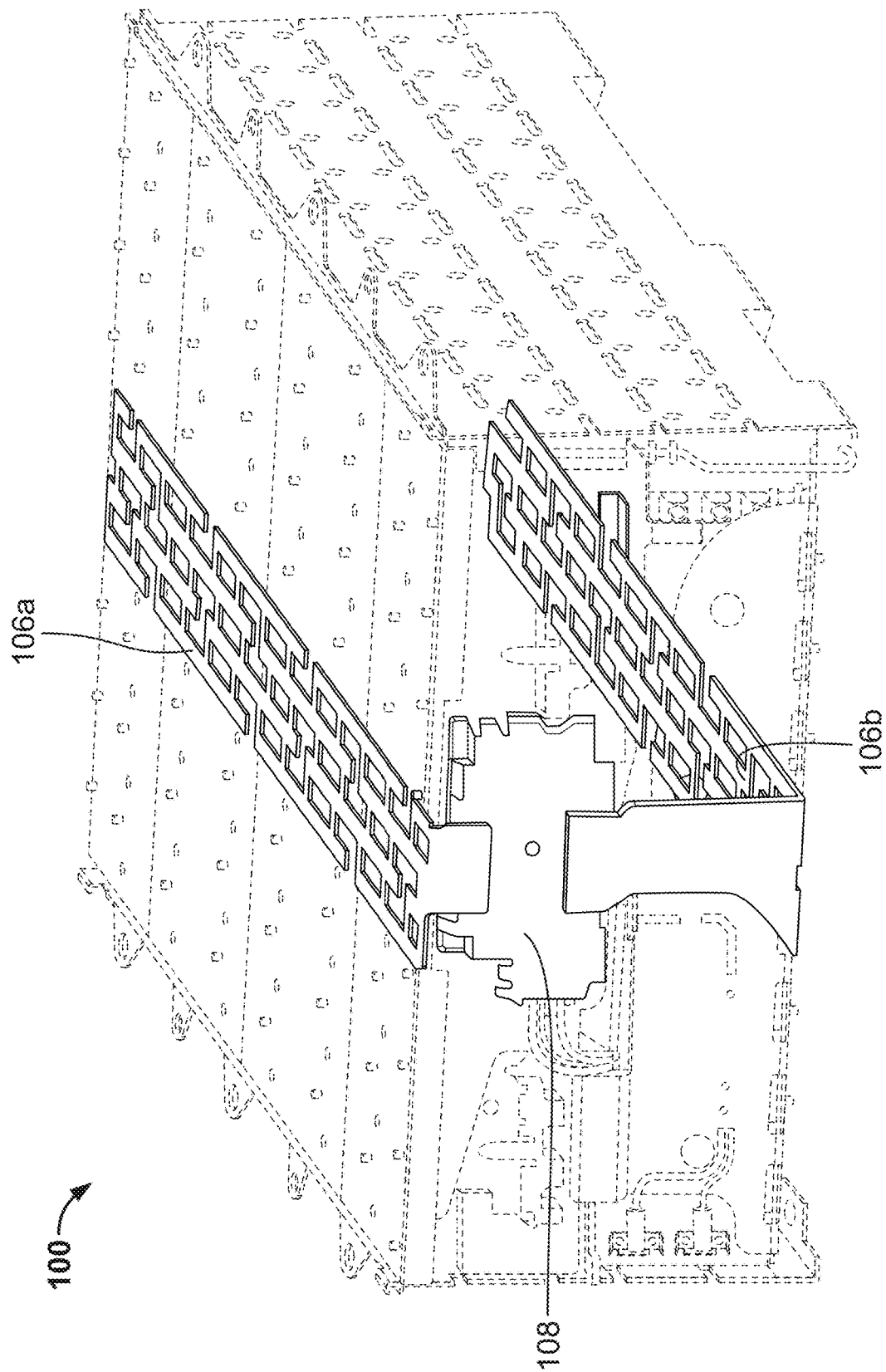
FIG. 2 shows a perspective view of first and second flex circuits and processing circuitry with the remainder of the battery module hidden from view, in accordance with some embodiments of the present disclosure.

FIG. 2 shows a perspective view of the first and second flex circuits 106a, 106b and the processing circuitry 108 with the remainder of the battery module 100 hidden from view, in accordance with some embodiments of the present disclosure. As shown, the processing circuitry 108 may be mounted on a sidewall of the battery module 100. As also shown in FIG. 1, the first flex circuit 106a may be disposed on the top surface of the battery module 100, and the second flex circuit 106b may be disposed on the bottom surface of the battery module 100. In some embodiments, the processing circuitry 108 may be mounted closer to the top surface of the first submodule 102a. In this case, the second flex circuit 106b may be longer than the first flex circuit 106a and extend up the sidewall of the battery module 100 to connect to the processing circuitry 108. However, this is only an example, and the processing circuitry 108 may be mounted equidistant from the top surface and the bottom surface of the battery module 100, or closer to the bottom surface of the battery module 100.

Figure 3:
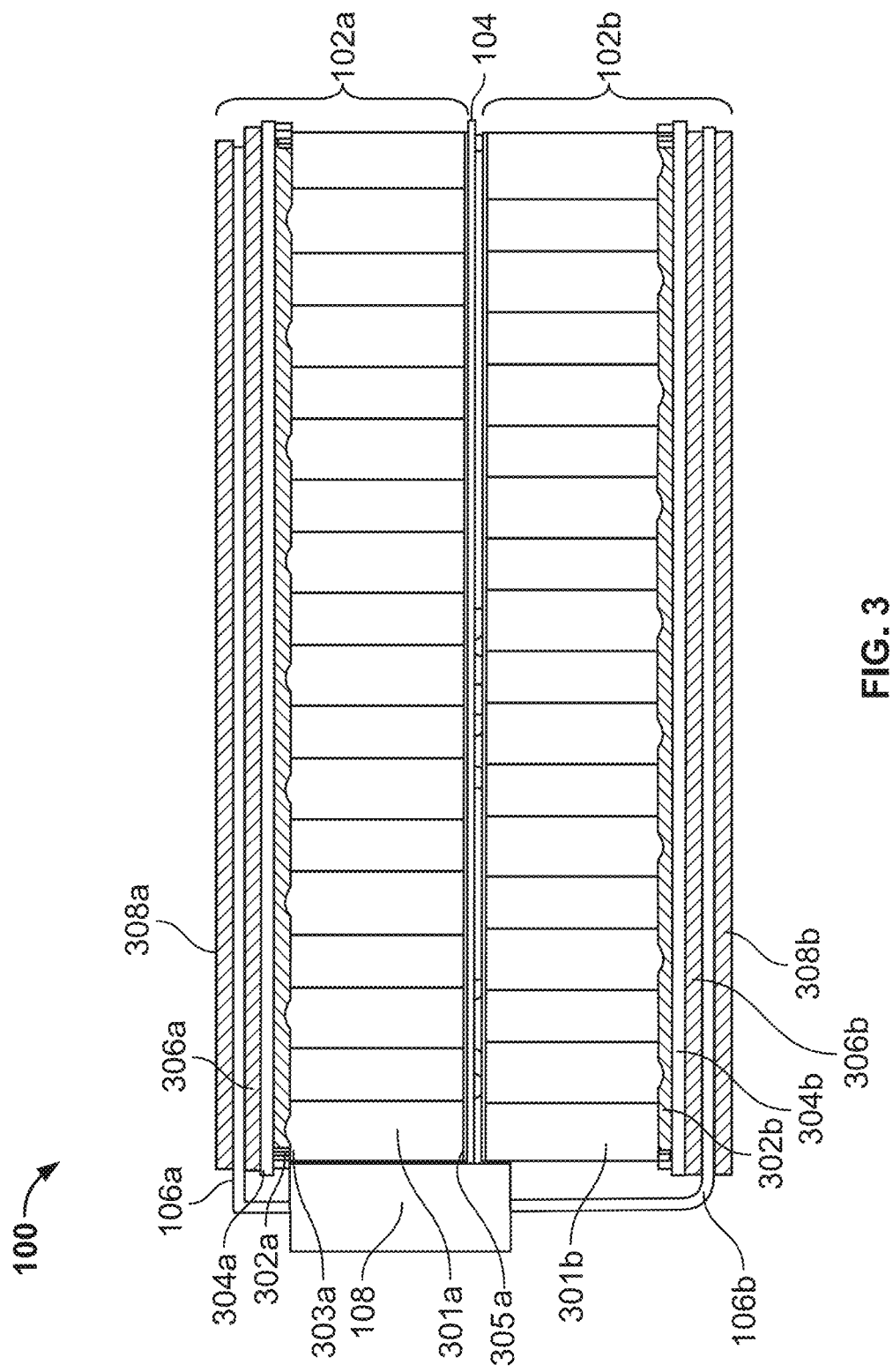
FIG. 3 shows a cross-sectional side view of the battery module, in accordance with some embodiments of the present disclosure.

FIG. 3 shows a cross-sectional side view of the battery module 100, in accordance with some embodiments of the present disclosure. As shown, the first submodule 102a and the second submodule 102b may be coupled to opposite sides of the cooling plate 104. In some embodiments, the first submodule 102a may be substantially similar to the second submodule 102b. Thus, for convenience of description, only the first submodule 102a is described below in detail. As shown, the first submodule 102a may include a first plurality of battery cells 301a. The battery cells 301a may be cylindrical and may have a first end 303a and a second end 305a. In some embodiments, the first end 303a may include a first electric terminal (e.g., a center button terminal). In some embodiments, each of the first plurality of battery cells 301a may have an exposed region of electrically active casing or a conductive jacket that covers at least a portion of the second end 305a, at least a portion of the first end 303a and a side of each battery cell 301a, forming the second electrical terminal (e.g., a rim terminal). As shown, the first submodule 102a may include a first carrier layer 302a. In some embodiments, the first carrier layer 302a may be a plastic, clear plastic, such as clear polycarbonate, clear acrylic, clear PET (polyethylene terephthalate), or any other appropriate material. As shown, the first end 303a of each of the first plurality of battery cells 301a may be inserted into and coupled to a respective recess of the first carrier layer 302a. In some embodiments, the second end 305a of each of the first plurality of battery cells 301a may be attached to a surface of the cooling plate 104 by an adhesive.

As shown, the first submodule 102a may include a first current collector assembly 304a. The first current collector assembly 304a may include a first plurality of busbars to electrically connect the first plurality of battery cells 301a in parallel and in series. For example, the first plurality of battery cells 301a may be arranged in a first plurality of groups, and the first plurality of busbars may electrically connect the battery cells 301a in each of the first plurality of groups in parallel with each other and electrically connect each of the first plurality of groups in series with each other. In this example, each of the first plurality of busbars may have a different operating voltage. As shown in greater detail in FIG. 4, each of the first plurality of parallel groups may be arranged from a first end of the battery module 100 (e.g., where the processing circuitry 108 is attached) to a second end of the battery module 100 opposite the first end (e.g., the first plurality of parallel groups may be arranged along the direction 110).

As shown, the first submodule 102a may include a first current collector frame 306a. The first current collector frame 306a may be a non-conductive material such as plastic and may be disposed on a top side of the first current collector assembly 304a. As shown in greater detail in FIGS. 6A and 6B, the first current collector frame 306a may have a same pattern as the first plurality of busbars and be positioned above respective projections of the busbars.

As shown, the first flex circuit 106a may be disposed on a top surface of the first current collector frame 306a. In some embodiments, the first flex circuit 106a may be attached to the first current collector frame 306a by an adhesive. As explained in greater detail below, conductive traces of the first flex circuit 106a may be electrically connected to at least two different locations of each of the first plurality of busbars.

As shown, the first submodule 102a may include a first cover 308a. The first cover 308a may be disposed over the first current collector frame 306a and the first flex circuit 106a. In some embodiments, the first cover 308a may be plastic (e.g., a clear plastic). As shown in greater detail below in FIG. 7, the first cover 308a may be connected to the first current collector frame 306a and the first flex circuit 106a may be sandwiched between the first cover 308a and the first current collector frame 306a.

As shown, the second submodule 102b includes a second plurality of battery cells 301b, a second carrier layer 302b, a second current collector assembly 304b, a second current collector frame 306b, the second flex circuit 106b, and a second cover 308b. Each of the components of the second submodule 102b may be substantially similar to the components of the first submodule 102a and therefore is not described here in detail.

Figure 4:
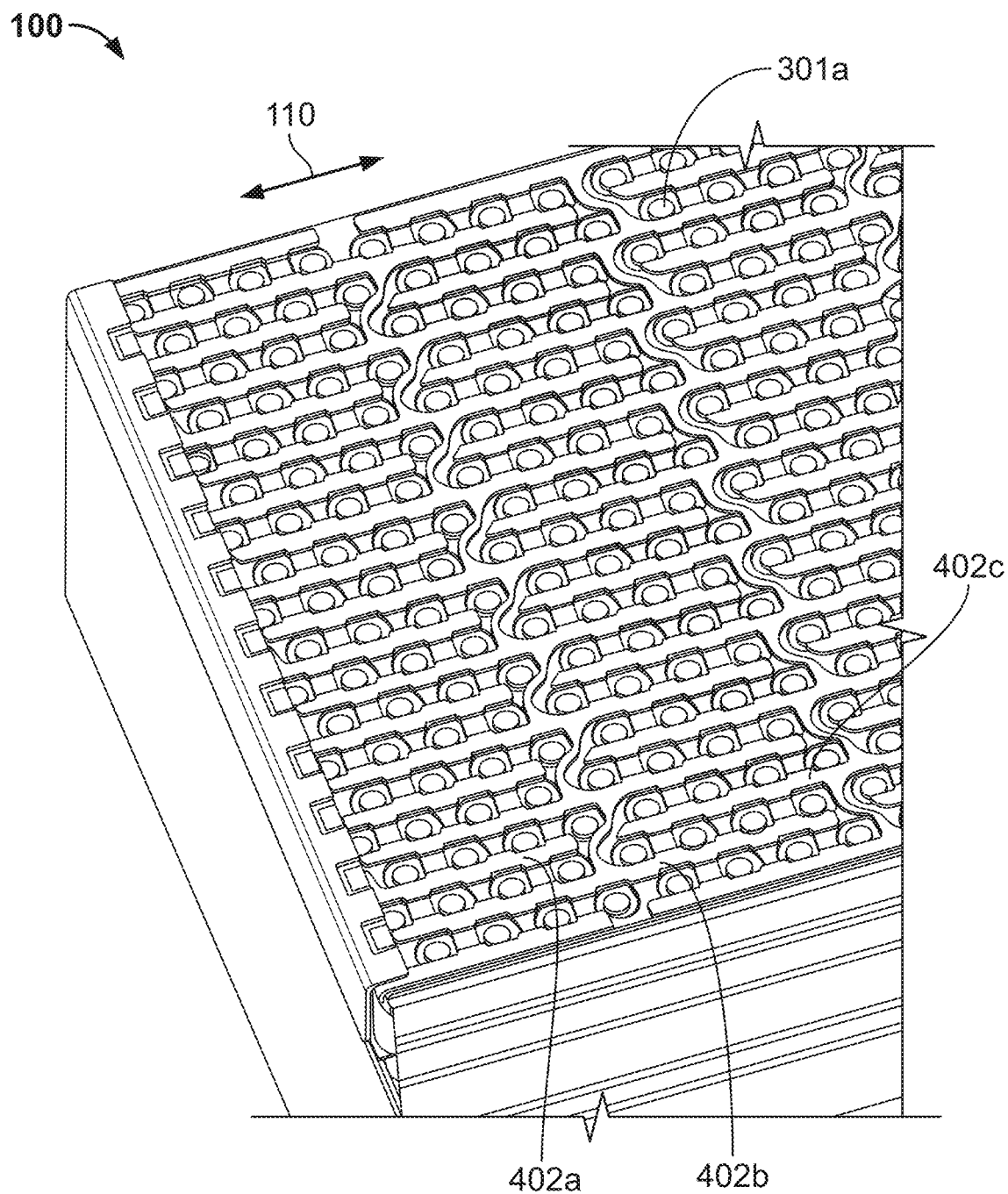
FIG. 4 shows a partial perspective view of a first plurality of busbars of a first current collector assembly of the battery module, in accordance with some embodiments of the present disclosure.

FIG. 4 shows a partial perspective view of the first plurality of busbars 402 (402a, 402b, 402c) of the first current collector assembly 304a of the battery module 100, in accordance with some embodiments of the present disclosure. In some embodiments, the first plurality of busbars 402 may comprise aluminum. As shown, the first current collector assembly 304a includes a first plurality of busbars 402 that connect the battery cells 301a in parallel and series, as described above. For example, in some embodiments, the first electrical terminal (e.g., the anode) of each of a first group of the first plurality of battery cells 301a may be connected to a first busbar 402a, the second electrical terminal (e.g., the cathode) of each of the first group of the first plurality of battery cells 301a may be connected to a second busbar 402b, the first electrical terminal of each of a second group of the first plurality of battery cells 301a may be connected to the second busbar 402b, the second electrical terminal of each of the second group of the first plurality of battery cells 301a may be connected to a third busbar 402c, the first electrical terminal of each of a third group of the first plurality of battery cells 301a may be connected to the third busbar 402c, and so on. That is, the groups of the first plurality of battery cells may be arranged along the direction 110. However, this is only one example, and the first plurality of battery cells 301a may be connected in any suitable manner.

As shown, each of the plurality of busbars 402 includes a spine that traverses the battery module 100 perpendicular to the first flex circuit 106a (e.g., perpendicular to the direction 110), and a plurality of projections that extend perpendicular to the spine. As shown in greater detail in FIGS. 1, 6A, and 6B, the first flex circuit 106a includes at least two parallel segments that are positioned above respective projections of the busbars and that are generally perpendicular to the spines. For example, the first flex circuit 106a may have a serpentine like shape that is generally perpendicular to the spines.

Each of the first plurality of busbars 402 may be electrically connected to each of the first plurality of battery cells 301a in any suitable manner (e.g., through welded tab). The second plurality of battery cells 301b may be connected in way substantially similar to the first plurality of battery cells 301a and will not be described again in detail.

Figure 5A:
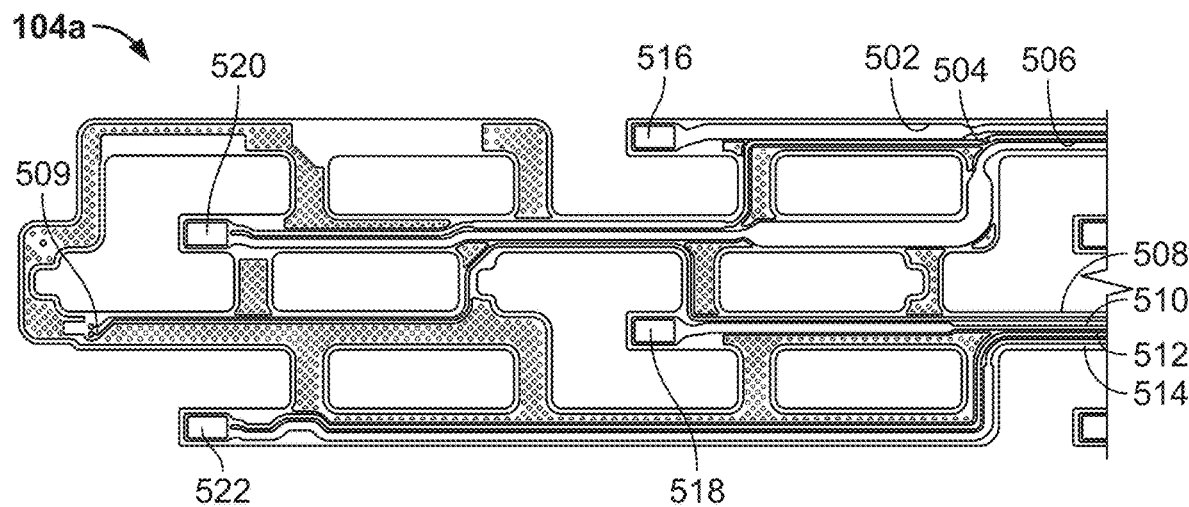
FIGS. 5A and 5B show partial views of a first flex circuit, in accordance with some embodiments of the present disclosure.
Figure 5B:
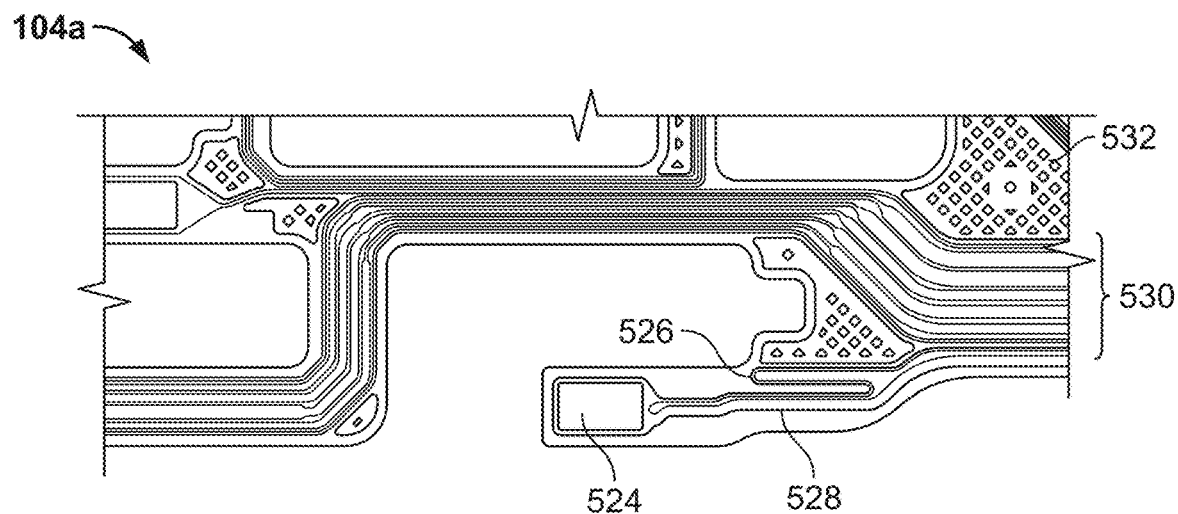

FIGS. 5A and 5B show partial views of the first flex circuit 106a, in accordance with some embodiments of the present disclosure. As described above, the second flex circuit 106b may be substantially similar to the first flex circuit 106a, except that in some embodiments, the first and the second flex circuits 106a, 106b may have different lengths to connect to the processing circuitry 108, depending on the placement of the processing circuitry 108. Accordingly, to avoid being repetitive, only the first flex circuit 106a is described here in detail.

As shown in FIG. 5A, the first flex circuit 106a may include a first plurality of conductive traces 502 and 506 and a second plurality of conductive traces 510 and 514. As shown, the plurality of conductive traces 502 and 506 and the second plurality of conductive traces 510 and 514 may be in different parallel segments. As shown, each of the first and second pluralities of conductive traces (502, 506, 510, 514) respectively includes, at a first end, a first terminal (516, 520, 518, 522). The first terminals 516 and 520 may be configured to be electrically coupled to a first location of a respective one of the first plurality of busbars 402, and the first terminals 518 and 522 may be configured to be electrically coupled to a second location of a respective one of the first plurality of busbars 402. For example, a pair of the first terminals 520 and 522 may be connected to one busbar (at two different locations), and a pair of the first terminals 516 and 518 may be connected to another busbar (at two different locations) of the first plurality of busbars 402. Each of the first and second pluralities of conductive traces (502, 506, 510, 514) respectively includes, at a second end opposite the first end, a second terminal configured to be electrically coupled to the processing circuitry 108. The processing circuitry 108 may be configured to measure a voltage level of each of the first plurality of busbars 402 using the first and second pluralities of conductive traces (502, 506, 510, 514). In some embodiments, the analog signal paths of the first and second pluralities of conductive traces (502, 506, 510, 514) may be converted to digital signals by the processing circuitry 108 and then values corresponding to the two locations on each of the plurality of busbars 402 may be combined (e.g., added or averaged) in the digital domain. In some embodiments, the analog signal paths of the first and second pluralities of conductive traces (502, 506, 510, 514) may be combined before being converted to a digital signal by the processing circuitry 108. Because two different conductive traces are used for each of the plurality of busbars 402, the processing circuitry 108 may still be able to measure a voltage level of each of the plurality of busbars 402, even in the case that one of the conductive traces is damaged or broken, regardless of whether the conductive traces are combined in the analog or digital domain. In some embodiments, it may be advantageous to load balance all of the conductive traces used for sensing voltage levels to have the same resistance (e.g., as shown below in FIG. 5B).

In some embodiments, the first flex circuit 106a may include a first power conductive trace 504 coupled to the first terminal 520, and a second power conductive trace 512 coupled to the first terminal 522. In some embodiments, the first and second power conductive traces 504, 512 may be configured to provide power to the processing circuitry 108.

In some embodiments, the first flex circuit 106a may include a pair of temperature conductive traces 508 coupled to opposite sides of a thermistor 509. The processing circuitry 108 may be configured to measure a temperature of the first submodule 102a using the pair of temperature conductive traces 508.

In some embodiments, the first flex circuit 106a may include portions not having any conductive traces in order to provide added structural support to the first flex circuit 106a before the first flex circuit 106a is being connected to the battery module. For example, as shown, the upper left end portion of the first flex circuit 106a does not include any conductive traces but may provide added structural support to the first flex circuit 106a.

FIG. 5B shows a partial view of the load balancing between conductive traces used for sensing voltage. For example, each of the second plurality of conductive traces 530 and conductive trace 526 may be load balanced to each have substantially the same resistance. To do this, as shown, the thickness of conductive traces may be varied as a function of how long the conductive trace is (e.g., longer conductive traces may be made thicker (e.g., wider on the flex circuit) than shorter conductive traces). Additionally, as shown, the shortest conductive traces (e.g., closest to the processing circuitry 108), may take a winding path to increase the resistance of the conductive trace (e.g., conductive trace 526 may have an s-shape). However, this is only one example, and the conductive traces used for sensing voltage may be load balanced using a combination of load-balancing techniques.

As shown, the conductive trace 526 may include, at a first end, a first terminal 524. In some embodiments, the first flex circuit 106a may include a power conductive trace 528 coupled to the first terminal 524. In some embodiments, the power conductive trace 528 may be configured to provide power to the processing circuitry 108. Because the first terminal 524 is connected to a different busbar than, e.g., the first terminals 520, 522, the power conductive trace 528 may provide a voltage to the processing circuitry 108 at a different voltage level than the first and second power conductive traces 504, 512.

In some embodiments, portions of the first flex circuit 106a that do not include conductive traces may include a pattern of the same material as the conductive traces (e.g., copper) to improve the rigidity of the first flex circuit 106a. For example, as shown, portion 532 may include a diamond pattern.

It will be understood that the first flex circuit 106a (or the second flex circuit 106b) may include fewer or additional conductive traces and sensors, based on a variety of factors. In some embodiments, it may be advantageous to detect the current flowing through the battery module 100 by comparing voltage levels in the first and the second submodules 102a, 102b.

Figure 6A:
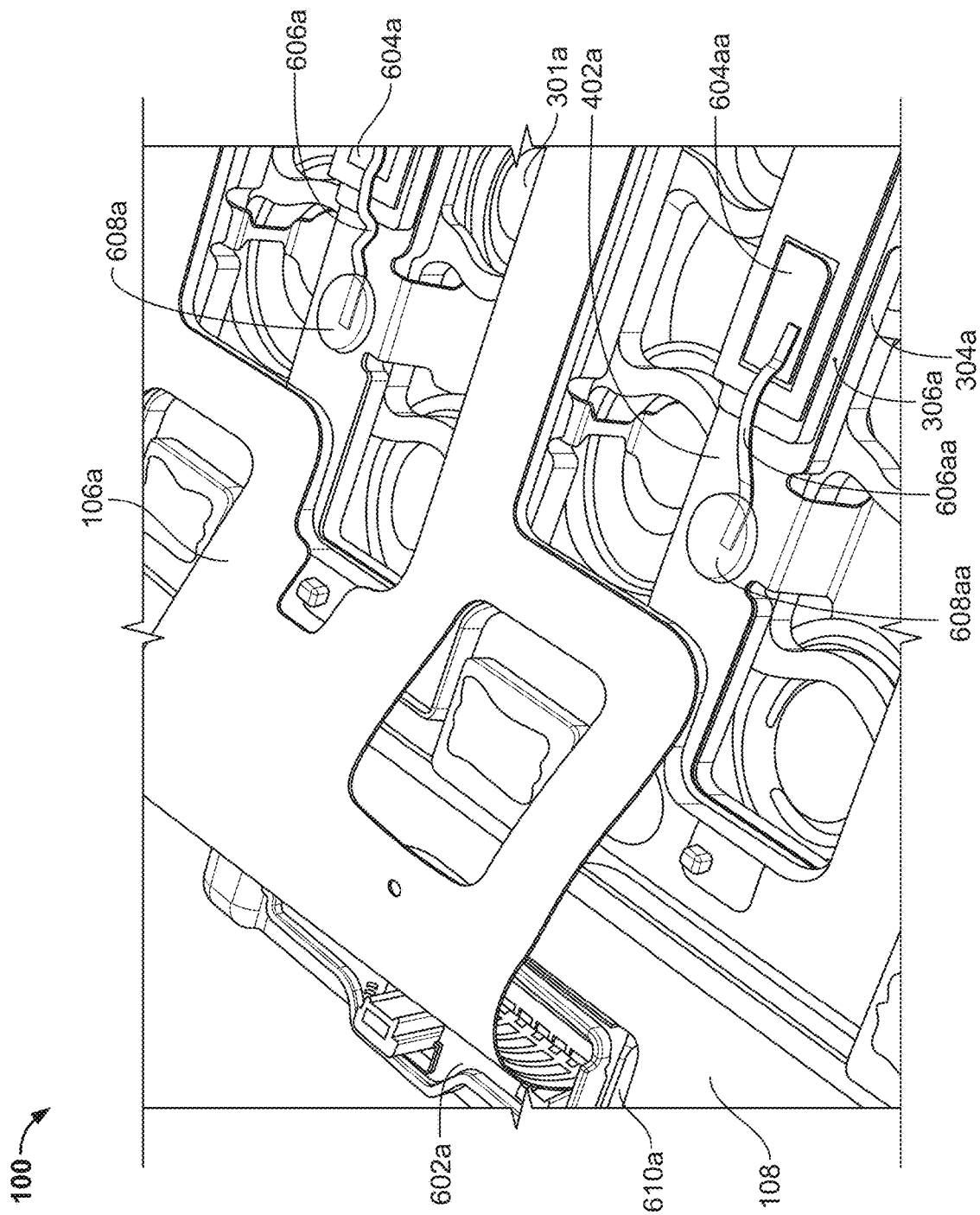
FIGS. 6A and 6B show partial views of a connection of one of a plurality of busbars to a first flex circuit, in accordance with some embodiments of the present disclosure.
Figure 6B:
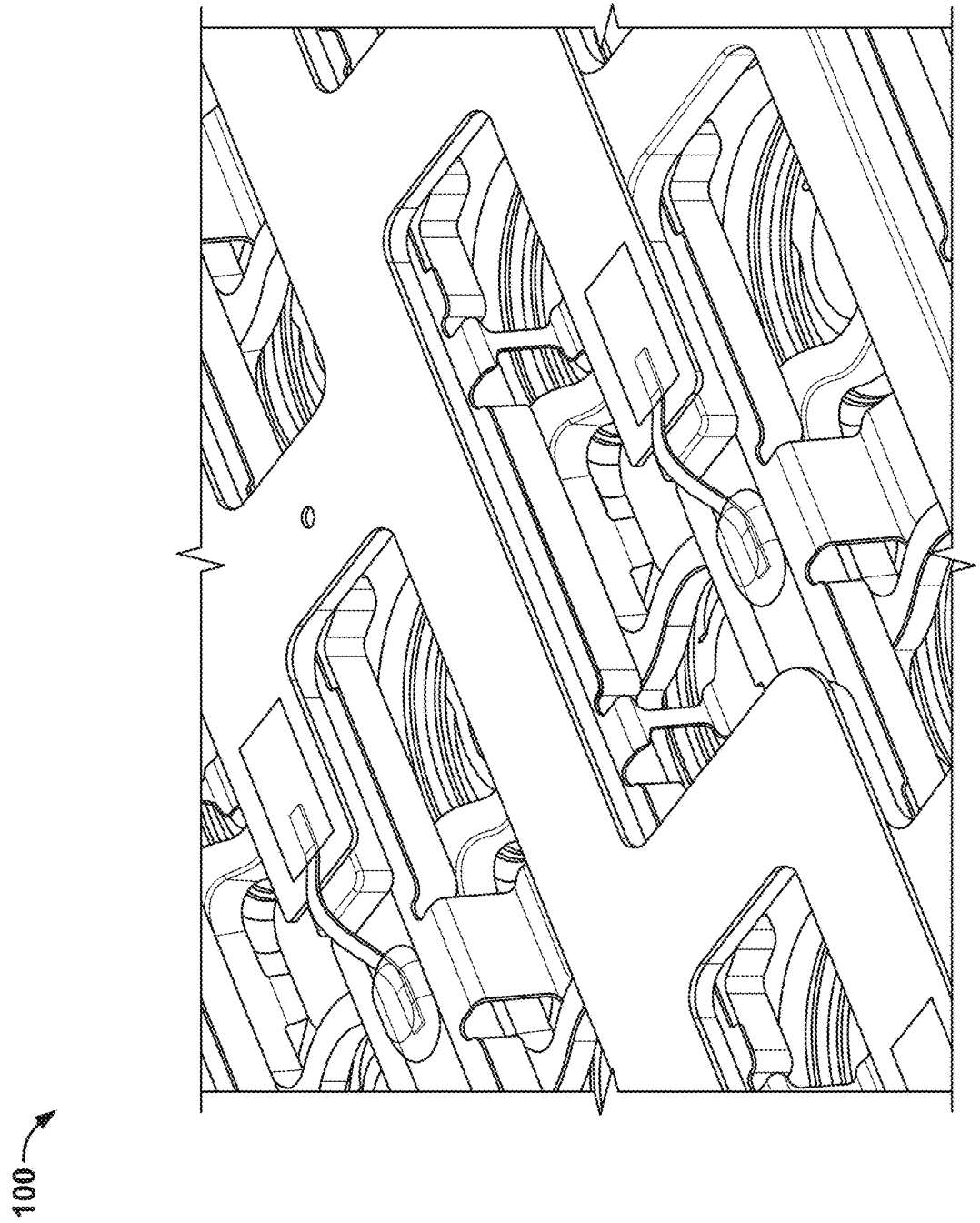

FIGS. 6A and 6B show partial views of a connection of one of the plurality of busbars 402 to the first flex circuit 106a, in accordance with some embodiments of the present disclosure. As shown in FIG. 6A, the first current collector frame 306a is disposed between the plurality of busbars 402 of the first current collector assembly 304a and the first flex circuit 106a. As shown, the first flex circuit 106a may include a pair of first terminals 604a, 604aa (e.g., from the parallel conductive traces of the first flex circuit 106a). With reference to FIG. 1, the first terminals 604a and 604aa may respectively correspond to the first terminals 112a and 112aa. As shown, the first terminal 604a may be electrically coupled to a first location of busbar 402a (of the plurality of busbars 402) by a ribbon 606a. In some embodiments, a first end of the ribbon 606a may be connected to the first terminal 604a by laser welding, and a second end of the ribbon 606a, opposite the first end, may be connected to the first location of the busbar 402a by laser welding. In some embodiments, it may be advantageous to laser weld the second end of the ribbon 606a to the first terminal 604a and ensure that the weld was properly made before laser welding the first end of the ribbon 606a to the first location of the busbar 402a. In this way, if the weld is determined not to be sufficient, the ribbon 606a may be replaced with a new ribbon before being connected to the busbar 402a. In some embodiments, the ribbon 606a may be nickel (or nickel-plated), and the busbar 402a may be aluminum. In this case, it may be advantageous to apply an adhesive 608a above a portion of the ribbon 606a in contact with the busbar 402a, so that once the adhesive 608a is cured, the adhesive 608a isolates the portion of the ribbon 606a in contact with the busbar 402a from air, thereby preventing corrosion at the connection due to the difference in the galvanic corrosion potential of nickel and aluminum. The first terminal 604aa may be connected to a second location of the busbar 402a by a ribbon 606aa in the same manner as described above (including the adhesive 608aa) and therefore is not described here in detail.

As shown, the first flex circuit 106a may include a first electrical connector 602a connected to the conductive traces of the first flex circuit 106a, and the processing circuitry 108 may include a second electrical connector 610a. When the first electrical connector 602a is connected with the second electrical connector 610a, the second terminals of the conductive traces are electrically coupled to the processing circuitry 108. The second flex circuit 106b may be connected to the processing circuitry 108 in substantially the same manner and therefore is not described here in detail.

As shown, because the first flex circuit 106a generally follows the busbars 402 and is not positioned directly over the plurality of battery cells 301a (i.e., the conductive traces of the first flex circuit 106a are positioned above respective projections of the busbars 402), the first flex circuit 106a may be shielded from damage in the case of a thermal runaway event. For example, the majority of the conductive traces of the first flex circuit 106a (e.g., more than 50%, 60%, 70% 80% or 90% of the conductive traces) are positioned above respective projections of the busbars 402.

FIG. 6B shows a partial view of the battery module 100 described above in FIG. 6A from a slightly different angle and therefore is not described again here in detail.

Figure 7A:
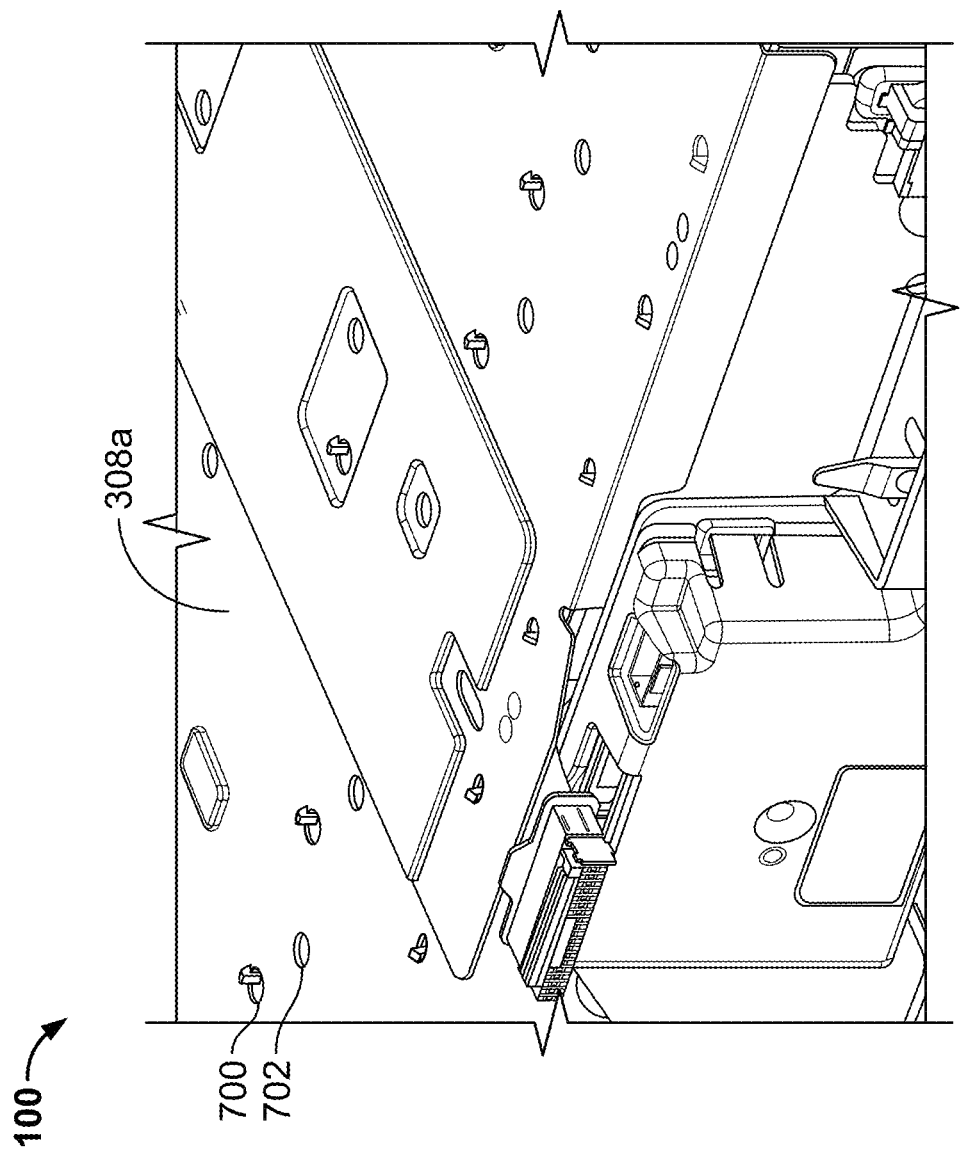
FIGS. 7A and 7B show partial views of a first cover installed on a top surface of a first submodule 102a of a battery module, in accordance with some embodiments of the present disclosure.
Figure 7B:
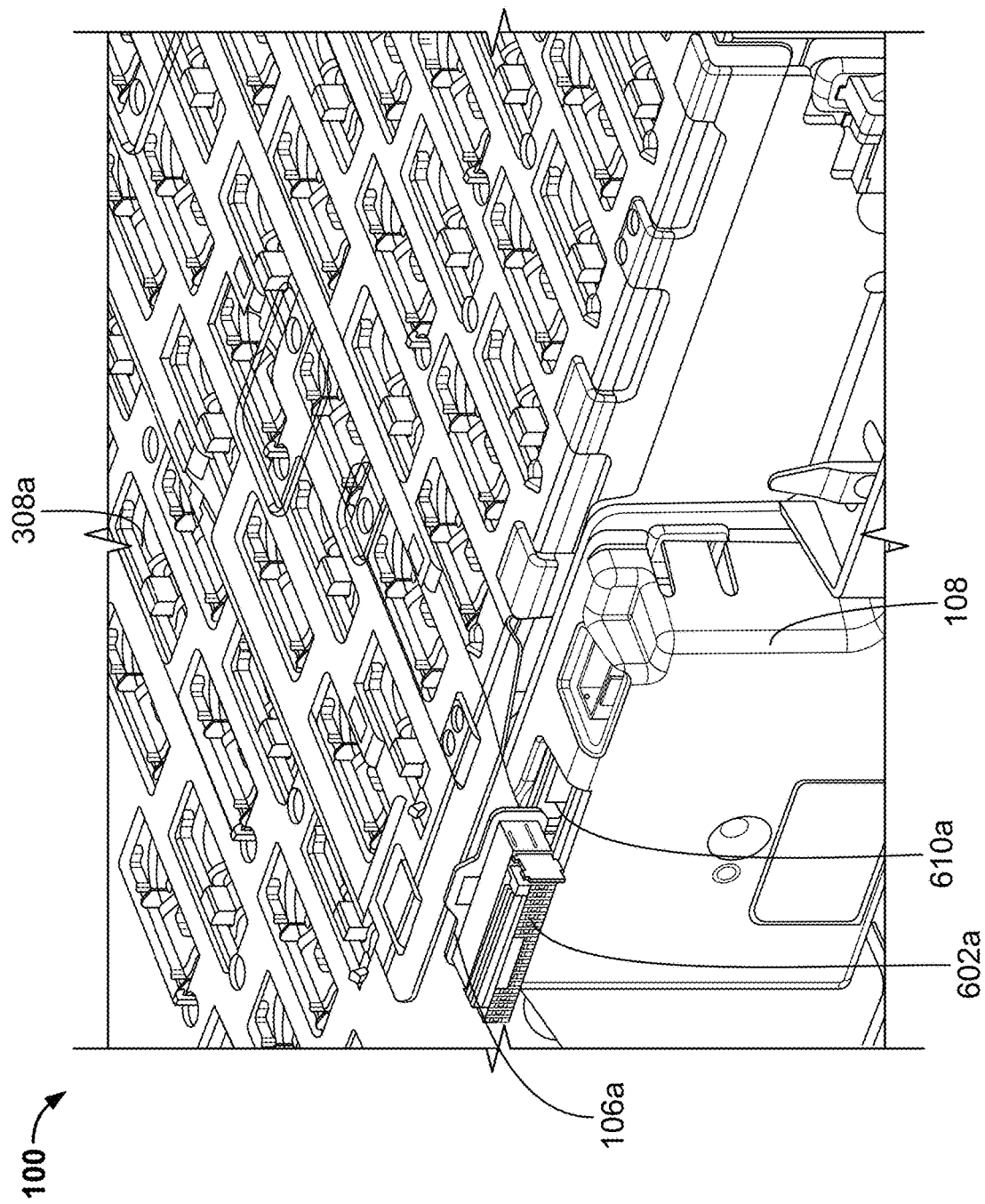

FIGS. 7A and 7B show partial views of the first cover 308a installed on a top surface of the first submodule 102a of the battery module 100, in accordance with some embodiments of the present disclosure. As shown in FIG. 7A, the first current collector frame 306a may include a plurality of clips 700 extending from a top surface of the first current collector frame 306a. As shown, the first cover 308a may include a plurality of through-holes 702 arranged to respectively correspond to the clips 700 such that when the first cover 308a is pressed onto the battery module 100, the first cover 308a is held in place by the clips 700. However, this is only one example, and the first cover 308a may be attached to the top surface of the first submodule 102a in any suitable manner (e.g., adhesive, connector, etc.).

FIG. 7B shows the partial view shown in FIG. 7A, but with a transparent first cover 308a (i.e., instead of the opaque first cover 308 shown in FIG. 7A). As shown, the first flex circuit 106a may be sandwiched between the first cover 308a and the first current collector frame 306a. As shown, the end portion of the first flex circuit 106a connected to the first electrical connector 602a may extend beyond the first cover 308a to be connected to the second electrical connector 610a of the processing circuitry 108. The second cover 308b may be installed on the top surface of the second submodule 102b (e.g., the bottom surface of the battery module 100) in a similar manner as the first cover 308a and therefore is not described again here in detail.

The foregoing is merely illustrative of the principles of this disclosure and various modifications may be made by those skilled in the art without departing from the scope of this disclosure. The above-described embodiments are presented for purposes of illustration and not of limitation. The present disclosure also can take many forms other than those explicitly described herein. Accordingly, it is emphasized that this disclosure is not limited to the explicitly disclosed methods, systems, and apparatuses, but is intended to include variations to and modifications thereof, which are within the spirit of the following claims.

What is claimed is:

1. A battery comprising:
a current collector assembly comprising a busbar configured to electrically connect a plurality of battery cells; and
a flexible printed circuit board comprising:
  a first conductive trace comprising:
    a first terminal configured to be electrically coupled to a first location of the busbar; and
    a second terminal configured to be electrically coupled to a first remote location; and
  a second conductive trace comprising:
    a first terminal configured to be electrically coupled to a second location of the busbar; and
    a second terminal configured to be electrically coupled to a second remote location.

2. The battery of claim 1, wherein:
the busbar is a first busbar;
the current collector assembly further comprises a second busbar configured to electrically connect the plurality of battery cells; and
the flexible printed circuit board further comprises:
  a third conductive trace comprising:
    a first terminal configured to be electrically coupled to a first location of the second busbar; and
    a second terminal configured to be electrically coupled to a third remote location; and
  a fourth conductive trace comprising:
    a first terminal configured to be electrically coupled to a second location of the second busbar; and
    a second terminal configured to be electrically coupled to a fourth remote location.

3. The battery of claim 2, wherein the first, second, third, and fourth remote locations couple the respective first, second, third, and fourth conductive traces to processing circuitry.

4. The battery of claim 3, wherein the processing circuitry is configured to measure a voltage level of each of the first busbar and the second busbar using the first, second, third, and fourth conductive traces.

5. The battery of claim 4, further comprising the processing circuitry, wherein:
the flexible printed circuit board comprises a first electrical connector coupled to the first, second, third, and fourth remote locations;
the processing circuitry comprises a second electrical connector; and
the first, second, third, and fourth conductive traces are electrically coupled to the processing circuitry when the first electrical connector and the second electrical connector are connected.

6. The battery of claim 5, wherein:
the processing circuitry is mounted on a side of the battery; and
the flexible printed circuit board extends from the side of the battery across a middle portion of the top or bottom of the battery.

7. The battery of claim 6, wherein:
a first end of the flexible printed circuit board proximate to the side of the battery is oriented substantially parallel to the side of the battery; and
a second opposite end of the flexible printed circuit board is oriented substantially parallel to the top or bottom of the battery.

8. The battery of claim 7, wherein:
the first electrical connector is located at the first end of the flexible printed circuit board; and
the flexible printed circuit board is secured to the battery by the first electrical connector being connected to the second electrical connector and adhesive applied to a portion of the flexible printed circuit board that extends across the middle portion of the top or bottom of the battery.

9. The battery of claim 4, wherein the processing circuitry is configured to combine analog signal paths corresponding to the first and second conductive traces and to combine analog signal paths corresponding to the third and fourth conductive traces.

10. The battery of claim 4, further comprising a plurality of ribbons, wherein each of the first terminals is electrically connected to a respective location of a respective busbar with a respective ribbon, and
wherein for each of the respective ribbons:
  a respective first end is connected to a respective first terminal by laser welding; and
  a respective second end is connected to a respective location of a respective busbar by laser welding.

11. The battery of claim 10, wherein:
each of the respective ribbons comprises nickel, aluminum or copper;
each of the first busbar and the second busbar comprises aluminum;
adhesive is applied above a portion of each of the respective ribbons in contact with a respective busbar; and
the adhesive, when cured, isolates each portion of each respective ribbon from air.

12. The battery of claim 3, wherein:
the flexible printed circuit board further comprises:
  a first power conductive trace coupled to the first terminal configured to be electrically coupled to the first busbar; and a second power conductive trace coupled to the first terminal configured to be electrically coupled to the second busbar; and the first and second power conductive traces are configured to provide power to the processing circuitry.

13. The battery of claim 1, wherein:

the flexible printed circuit board extends from one side of the battery across the battery;

the busbar comprises:
a spine that traverses the battery; and
a plurality of projections that extend from the spine; and the flexible printed circuit board comprises at least two segments that are positioned above the projections of the busbar.

14. The battery of claim 1, wherein the current collector assembly comprises a plurality of busbars and a majority of each of the first and second conductive traces run above the plurality of busbars.

15. The battery of claim 2, wherein:

the flexible printed circuit board extends from one side of the battery across the battery;

the first and third conductive traces are routed along the left side of the flexible printed circuit board; and the second and fourth conductive traces are routed along the right side of the flexible printed circuit board.

16. The battery of claim 2, wherein the current collector assembly comprises a plurality of busbars including the first busbar and the second busbar, and wherein the battery further comprises the plurality of battery cells, wherein the plurality of battery cells are arranged in a plurality of groups, wherein the plurality of busbars are configured to electrically connect battery cells in each of the plurality of groups in parallel with each other and electrically connect each of the plurality of groups in series with each other.

17. The battery of claim 2, wherein each of the first and third conductive traces and the second and fourth conductive traces are balanced to each have substantially the same resistance.

18. The battery of claim 2, wherein the current collector assembly is a first current collector assembly, the first and second busbars is a first plurality of busbars, the plurality of battery cells is a first plurality of battery cells, and the flexible printed circuit board is a first flexible printed circuit board, the battery further comprising:

a second current collector assembly comprising a third busbar and a fourth busbar configured to electrically connect a second plurality of battery cells; and a second flexible printed circuit board comprising:
a fifth conductive trace comprising:
a first terminal configured to be electrically coupled to a first location of the third busbar; and
a second terminal configured to be electrically coupled to a fifth remote location;

a sixth conductive trace comprising:
a first terminal configured to be electrically coupled to a second location of the third busbar; and
a second terminal configured to be electrically coupled to a sixth remote location;

a seventh conductive trace comprising:
a first terminal configured to be electrically coupled to a first location of the fourth busbar; and
a second terminal configured to be electrically coupled to a seventh remote location; and an eighth conductive trace comprising:
a first terminal configured to be electrically coupled to a second location of the fourth busbar; and
a second terminal configured to be electrically coupled to an eighth remote location.

19. The battery of claim 18, wherein the first plurality of battery cells is mounted on a first side of a cooling plate and the second plurality of battery cells is mounted on a second side of the cooling plate, opposite to the first side.

20. A battery comprising:

a current collector assembly comprising a plurality of busbars configured to electrically connect a plurality of battery cells; and a flexible printed circuit board comprising:
a first plurality of conductive traces, wherein:
each of the first plurality of conductive traces comprises:
a first terminal configured to be electrically coupled to a first location of a respective one of the plurality of busbars; and
a second terminal configured to be electrically coupled to processing circuitry; and a second plurality of conductive traces, wherein:
each of the second plurality of conductive traces comprises:
a first terminal configured to be electrically coupled to a second location of a respective one of the plurality of busbars; and
a second terminal configured to be electrically coupled to the processing circuitry, wherein each of the plurality of busbars comprises respective first and second locations to which corresponding ones of the first plurality of conductive traces and the second plurality of conductive traces are configured to be electrically coupled.

* * * * *